June 23, 1964 N. G. VOGL, JR 3,138,719

MAGNETIC CORE LOGIC CIRCUITS

Filed Dec. 29, 1960

2 Sheets-Sheet 1

INVENTOR
NORBERT G. VOGL, JR.

BY Melvin P. Williams

AGENT

June 23, 1964 N. G. VOGL, JR 3,138,719

MAGNETIC CORE LOGIC CIRCUITS

Filed Dec. 29, 1960 2 Sheets-Sheet 2

United States Patent Office 3,138,719
Patented June 23, 1964

3,138,719
MAGNETIC CORE LOGIC CIRCUITS

Norbert G. Vogl, Jr., Wappingers Falls, N.Y., assignor to International Business Machines Corporation, New York, N.Y., a corporation of New York Filed Dec. 29, 1960, Ser. No. 79,302
8 Claims. (Cl. 307—88)

This invention relates to logic circuits and more particularly to logic circuits which provide the storage and/or transfer of electrical signals representative of information.

In the data processing and computing arts, the toroidal magnetic core having square-loop hysteresis properties is well-known both as a storage medium and as a logic circuit element.

Such cores are frequently arranged in a form of logical circuit known as a "shift register" or "transfer register" which is employed to perform many different functions. This type of circuit may be used as an input or output register, may provide delay, or assist in arithmetic operations, or perform other logical functions in the handling of electrical manifestations of useful information. In shift registers, the objects are to provide an output signal having sufficient power to operate the input circuit of a next succeeding stage (the input circuit frequently being another toroidal core) and to permit forward transfer of information without the possibility of having information transferred retrogressively.

Many forms of shift registers are known including a variety of types employing magnetic cores. One well-known type permits forward transfer of information while preventing the backward transfer thereof by employing diodes to regulate the polarities of current flow therein. Other types rely on resistance in series with the windings, and/or slow, critical switching time of some of the cores employed in the shift register. Another approach to the problem of developing shift registers which will not retrogressively transfer information is the use of critical flux level differences between various cores; in some of these devices, different numbers of turns of input and output windings are applied on some of the cores, while in others, cores are used which have a different size or material, and therefore a different volt-second capacity. In still other forms of shift registers, multi-apertured cores are used in order to logically transfer information in the forward direction only.

In some of the shift register devices described above, the manufacture of large planar arrays of shift register stages is rendered impractical due to the need of having diodes, resistors, or other elements inserted in series with the windings, between various cores within the array. Inasmuch as planar arrays of cores are formed with single-turn windings by passing straight wires through coordinate rows of cores in a plane, the application of a plurality of turns in some windings and single turns in other windings renders the well-developed manufacturing technique for assembling simple storage arrays impractical for use in assembling such shift registers. Similarly, the formation by automatic means of planar arrays of shift registers is made difficult when cores of different material or size are to appear in only some predetermined positions within the plane; the automatic placing of cores on a jig for ultimate winding into a planar array requires that each of the cores be substantially identical to every other one.

From the foregoing, it can be seen that, though the known forms of shift registers may perform many more functions than the well-known simple planar core storage, the simple planar core storage is much more easily manufactured by automatic machines, and therefore more practical for commercial use in computers and other data processing equipment wherein many tens of thousands of such cores may be required.

Wherefore it is a primary object of this invention to provide an improved shift register. Other objects of the invention include the following:

To provide an improved shift register comprising toroidal magnetic cores.

To provide a register comprised of single turn windings on toroidal cores with no other internally-connected circuit components.

To provide an improved shift register comprising toroidal magnetic cores of a single size.

To provide a shift register which lends itself to easy assembly.

To provide a shift register which may be assembled by readily available mechanical means.

To provide a shift register capable of manufacture in simple planar arrays.

To provide a matrix storage apparatus having improved characteristics.

Because of their modes of operation, many shift registers are incapable of having selectable outputs such as could perform logical functions. This may be due to the need to operate on an output core early within a sequence of operation in order to prepare for the ultimate output pulse, or due to an inherent lack of selectability for other reasons.

Another object of the invention is to provide a shift register capable of logical functions.

A further object is to provide a shift register having selective outputs.

In some of the shift registers which have been devised employing only toroidal cores, within a single register stage of which one core may drive another core, a phenomenon, which is sometimes called "flux lock," may occur due to the inherent power losses in windings and in the hysteresis of the cores themselves. This phenomenon may be explained by considering a pair of square-loop cores coupled together wherein the first core is set and its resulting output pulse is used to set the second core, and thereafter the second core is reset and the resulting output power is used to reset the first core. In this example, not all of the energy released by the setting of the first core is converted into flux in the second core because of the copper losses in the coupling windings, and because of the hysteresis losses in the cores themselves. It can be seen that in the setting and resetting of the above example, there can be less flux than that necessary to reset the first core, upon resetting the second core. Therefore, a shift register wherein each core is affirmatively driven by a power source will be inherently more reliable in operation, and be capable of propagating information signals through a greater number of stages of logic. Furthermore, the output stage of a shift register preferably undergoes a maximum change in flux (that is equal to the saturation value), in order to more easily set or reset the input stage of a similar shift register.

Other objects of the invention include:

Providing a positively driven shift register having input and output stages which operate within similar limits of flux level change.

Providing a shift register having a minimum of losses therein.

Providing a transfer register having an inherently more reliable operation.

In accordance with my invention, there is provided a novel magnetic core logical circuit in which simple toroidal magnetic cores of the same size may be assembled in simple planar arrays with core plane assembly machinery now in use in the manufacture of core storage arrays. My invention utilizes the fact that a short-circuit winding on a core will prevent the core from switching. By linking several cores with a short-circuit winding, a first core cannot switch unless another, closely-coupled core can switch in an opposite direction, and thereby generate an opposite electromotive force (or back E.M.F.) simultaneously with said first core. I achieve this result by providing a short-circuit winding between the magnetic cores of a novel shift register, whereby the cores are made dependent upon one another, in their ability to switch magnetic flux directions, through the electrical coupling of the shorted turn.

In preferred embodiments of my invention, I employ three toroidal cores having one short-circuit winding common to all of the cores. The switching of each one of said cores is dependent on the simultaneous switching of another one of said cores. Additionally, I provide means whereby the switching of a first one of said cores, hereinafter designated as an output core, is further limited to be possible only with the simultaneous opposite switching of a second one of said cores, hereinafter referred to as a storage core. A third core, hereinafter called a switch core, permits the reset-switching of said first core, and also permits switching of said second core in response to input signals.

In a further embodiment of my invention, I provide a plurality of output cores whereby proper interrogation will permit separate, distinct outputs in a manner useful in many well-known logical circuits.

According to my invention, the above embodiments may be arranged in simple planar arrays. The second stated embodiment is shown, by way of example, in a matrix register assembled in two planes of cores, one plane being designated an input plane and the other plane being designated an output plane.

My invention provides a versatile magnetic circuit which has high reliability, fast switching speeds, and low losses. It may be employed in arrays of any size, the number of stages through which information is to propagate being completely immaterial to the satisfactory operation of the device.

The foregoing and other objects, features and advantages of my invention will be apparent from the following more particular description of preferred embodiments thereof as illustrated in the accompanying drawings.

In the drawings:

FIG. 1*a* is a perspective of one embodiment of the invention showing a magnetic core logic circuit comprising toroidal cores and single-turn windings.

FIG. 1*b* is a diagram of the signals related to the various windings and the direction of flux saturation resulting from said signals in the individual cores of the embodiment shown in FIG. 1*a*.

FIG. 1*c* is a schematic diagram of the embodiment of FIG. 1*a*, shown in the well-known dot notation form of illustration.

FIG. 1*d* is a perspective view of a second embodiment of my invention wherein the device of FIG. 1*a* is modified so as to have an additional output core and corresponding additional drive and output windings.

FIRST EMBODIMENT—AIDING STORAGE CORE

Figure 1C:
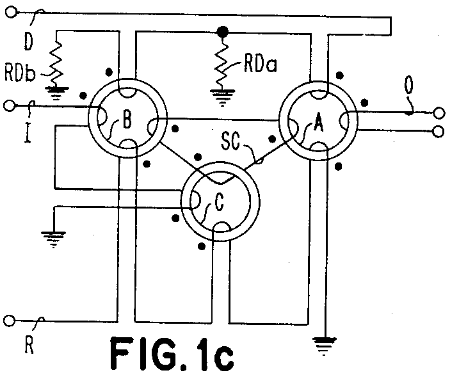
Figure 1D:
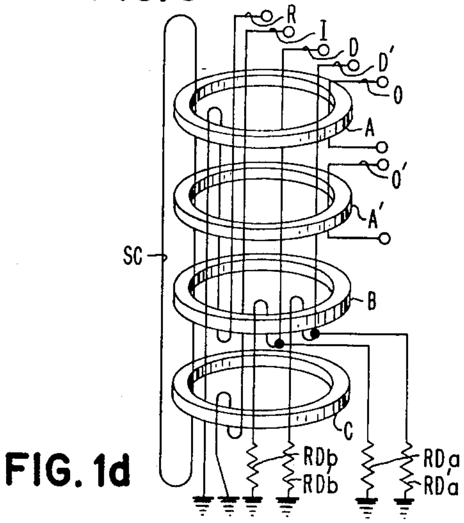
Figure 1A:
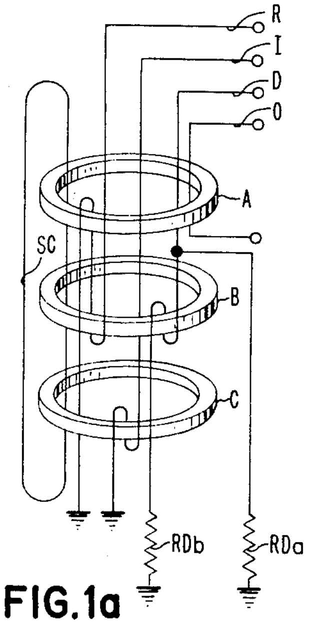
Figure 1B:
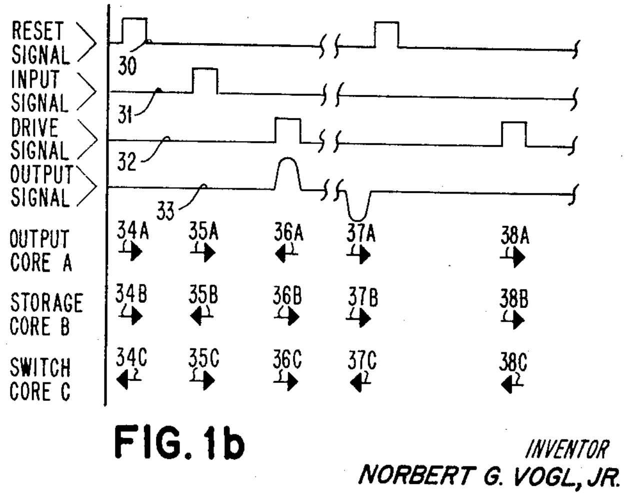

[FIGS. 1*a* and 1*b*]

One embodiment of the invention, as shown in FIG. 1*a*, comprises three toroidal magnetic cores, of the type having square-loop hysteresis characteristic, including an output core A, a storage core B and a switch core C. These cores are linked together by a shorted turn, or short-circuit winding SC. A reset winding R passes upward through core B, upward through core A, and downward through core C, to ground. An input winding I bypasses core A, but passes downward through core B and upward through core C and thence to ground. A drive winding D passes downward through core A and is then split into two lines. The current on drive winding D that passes through core B is some fraction of that current which passes over the same line through core A; this is accomplished by means of a pair of current-dividing resistors RD*a* and RD*b*. While some of the current flows through RD*a* to ground, the remainder of it flows upward through core B and then through RD*b* to ground. An output winding O passes downward through core A. The functions of the various elements of the device of FIG. 1*a* will become apparent in the following description of operation, which will be more fully understood with reference to the signals and resulting flux changes shown in FIG. 1*b*.

The signals, as well as the arrows representing flux changes, at the left side of the break lines in FIG. 1*b* illustrate a sequence of operation in which an input signal 31 is applied to the input winding I; the signals and arrows to the right side of the break lines in FIG. 1*b* represent a sequence of operation in which no input signal is applied. In any sequence, the first signal that is to be applied to the device of FIG. 1*a* is a reset signal 30 which is applied to the reset winding R. The reset signal ensures that, at the start of any sequence of operation, the various cores A, B, C, will be saturated with magnetic flux in a known direction. Specifically, the reset signal 30 applied to reset winding R will establish saturation flux in core A which is counterclockwise, or to the right, as shown by the arrow 34A; in core B, flux will also be established in a counterclockwise direction, or to the right, as shown by the arrow 34B. Since the reset winding R passes downward through core C, flux will be established in the clockwise direction, which is to the left, as shown by the arrow 34C.

As is well-known in the magnetic arts, when a change of flux is induced in a core, the change tends to generate current in any conductors that are magnetically linked with the core. With respect to toroidal cores, having single-turn, straight-line windings, magnetizing current flowing in one direction through the core tends to induce current in the opposite direction in all other windings. However, as described in more detail hereinafter, regardless of whether or not the last sequence of operation has produced an output pulse, the reset signal 30 applied to the reset line R will, in establishing the proper flux directions in the cores A, B, C, not result in any appreciable current flowing in the short circuit winding SC. Due to the output load on core A, there will be a small net current in the winding SC as a result of cores A and C being reset.

The next possible signal is an input signal 31 which may be applied to the input winding I. This signal will cause current to flow downward through core B and upward through core C; no current is applied to core A. Since downward current in core B tends to switch it to the left, and since core B had been saturated with flux to the right, core B can switch at this time. Similarly, core C having been saturated with flux to the left, may now respond to current flowing upwardly through it on the input winding I to switch to the right. Therefore, cores B and C can simultaneously switch in opposite directions. Since each of these cores tends to induce current into the short-circuit winding SC in opposite directions, there is no net current in the winding SC, and all of the current in the input winding I is utilized in switching the cores, rather than in inducing opposing currents in the short circuit winding SC. Each of these cores will supply a back electromotive force, or E.M.F., to the other to permit the switching of flux saturation directions.

After the passage of some time (which time may be a fraction of a second, or several hours, or longer), a drive signal 32 may be applied to the drive winding D of the shift register shown in FIG. 1*a*. The time of applying this pulse is determined by computer programming or other timing, and is the particular time at which it is desired to sample this stage; thus, a drive signal 32 is applied to see if an input signal 31 has or has not been applied thereto at some prior time. As is well-known in the data processing and computing arts, an input signal may represent the binary bit one, whereas the lack of an input signal may be indicative of the binary bit zero. Therefore, an output signal obtained in response to a prior input signal provides the storing and sensing of a binary bit one, the lack of an output signal being indicative that no input signal had been applied theretofore. As before mentioned, the current in the drive winding D which is caused by the drive signal 32 is divided so that only a portion of that current flows upward through core B, although all of the drive current flows downward through core A. By proper choice of the relative values of the resistances RD*a* and RD*b* (or in any other suitable way), core A will have enough current to switch and to induce sufficient current in the short-circuited turn SC, which together with sufficient current through the drive winding D passing upward through core B, will simultaneously permit core B to switch. As shown in FIG. 1*b*, after an input signal 31 has been applied to the input winding I, core A is saturated to the right and core B is saturated to the left. Therefore, current flowing downward through core A and upward through core B can cause each of these cores to switch their directions simultaneously as shown by the arrows 36A and 36B. When core A switches, it generates an output signal 33 on the output winding O. This is the indication to the data processing equipment that an input signal has been applied to the register at some prior time. Note that core A is driven to full saturation in the two respective directions by the reset signal on winding R, and by the drive signal on winding D.

At some time subsequent to deriving an output from the device of FIG. 1*a*, another reset signal 30 (shown at the right-hand side of FIG. 1*b*) may be applied to the reset winding R. The signal 30 causes current to flow upward through core A, and since this is opposite to the drive current last applied to core A (the drive current having been downward), this will cause core A to switch from left to right as shown by the arrow 37A. The current flowing upward through core B tends to further saturate it to the right, so that there will be no change in the flux of core B as a result of the reset signal. However, core C has been switched to the right by the input signal 31 (as shown by the arrow 35C) and, since the drive signal 32 does not affect core C (as shown by the arrow 36C), core C is still saturated to the right at the time that the reset signal 30 is applied. The current flowing in the reset line R downward through core C will cause it to switch to the left as shown by the arrow 37C. Note that the input signal causes cores B and C to switch together, the drive signal causes cores A and B to switch together, and the reset signal re-establishes the circuit by switching cores A and C simultaneously. When core A is reset to the right, a negative output signal 33 appears on the output winding O. However, since this is during reset time (axiomatically), and since it is also in a negative direction, there is no harm in having this redundant, negative signal appear on output winding O.

At some subsequent time, when it is desired to determine whether or not an input signal has been applied, another drive signal 32 (shown at the extreme right of FIG. 1*b*) is applied to the drive winding D. As before, this current tends to switch core A from right to left and tends to switch core B from left to right. However, core B is already saturated to the right, having been set by the last-applied drive signal (arrow 36B) and not having been switched by a subsequent input signal 31, so that core B will not be affected by the drive signal 32 at this time (arrow 38B). The current downward through core A on winding D tends to induce current upward through core A in the short-circuit winding SC, which would apply current upward through core C. Therefore, core C tends to be switched from left to right, and is potentially able to switch with core A at this time. However, as before mentioned, the current in the drive winding D resulting from the drive signal 32 is limited by the resistors RD*a* and RD*b* (which limitation may be implemented by other suitable means) so that the E.M.F. induced in the short circuit winding as a result of the tendency to switch core A is insufficient to cause core C to switch. Therefore, core C cannot supply a back E.M.F. for reflection through the short-circuited turn SC to core A, and core A cannot switch at this time. With reference to the extreme right-hand side of FIG. 1*b*, and the arrows 38A, 38B and 38C, it will be seen that no cores are switched as the result of a drive signal following a reset signal with no intervening input signal, nor is any output signal derived from such a sequence of operation.

As shown by the arrows 37 and 38, in the no-input sequence of operation, the cores remain saturated in the same directions in which they would be saturated by a reset signal. Therefore, the next reset signal will have no effect on the cores. Furthermore, in both input signal sequences and no-input signal sequences, the storage core B is always left set in the proper direction, it being switched from right to left by an input signal and from left to right by the next following drive signal. However, since core B is saturated in the same direction that current is tending to saturate it, it represents no load to the reset winding, and, there is no harm in having the reset current applied to core B. Therefore, the reset signal 30 will reverse cores A and C simultaneously (following an input signal sequence), or will reverse no cores at all (following a no-input signal sequence). Since cores A and C reverse in respectively opposite directions, there is never any appreciable current induced in the short circuit winding SC as a result of resetting the cores, as described with respect to the input signal and cores B and C, hereinbefore. It may be noted that the reset winding R is threaded through core B so that, in establishing initial operating conditions, or in following trouble-shooting procedures, the reset signal will cause core B to be established properly with respect to the other cores at the start of the first operating sequence.

The preferred embodiment of FIG. 1*a* utilizes current division of the drive current by means of resistors RD*a* and RD*b*. One critical factor in this embodiment is that the drive current applied to core A be limited so as to be insufficient to switch core A and (by induction through the short circuit winding SC) simultaneously switch core C, in a no-input sequence of operation. Resistor RD*a* could be removed, leaving resistor RD*b* to limit the current on drive winding D, or any suitable current limiting means, including a limited source for drive signal 32, could be employed, in order to satisfy this requirement. However, resistors RD*a* and RD*b* are required to provide a greater drive current in core A than in core B, since core A must drive a load on its output winding O. If current division were not employed, core A would switch a little more slowly than core B, and core B could induce sufficient current in the short circuit winding SC to switch core C simultaneously with cores A and B. If this happened, core A would not fully switch in response to the drive pulse and the output signal would consequently be reduced.

ALTERNATIVE SCHEMATIC OF FIRST EMBODIMENT

[FIG. 1*c*]

The device shown in FIG. 1*a* is presented in an alternative form in FIG. 1*c*. The cores, windings, and resistors are the same in FIG.1*c* as those shown in FIG. 1*a*, they being redrawn for the convenience of those to whom this type of circuit diagram is more familiar.

Specifically, it can be seen that a reset signal on reset winding R will saturate cores A and B in the counterclockwise direction, and saturate core C in the clockwise direction. An input signal on input winding I will switch core B from the counterclockwise to the clockwise direction, and tend to induce a clockwise current in the short-circuit winding SC; current on input winding I will also switch core C from clockwise to counterclockwise and tend to establish counterclockwise current in the short-circuit winding SC. As in FIG. 1*a*, these currents cancel, leaving nearly zero current in the short-circuit winding SC. A current subsequently applied to the drive winding D will switch core A clockwise, tending to generate a clockwise current in the short-circuit winding SC. A portion of the current (determined by the relative values of RD*a* and RD*b*) will tend to switch core B to the counterclockwise direction; the clockwise current induced in the short-circuit winding SC aids the current in the drive winding D, so core B will switch.

In a sequence of operation in which there is no input signal applied to the input winding I prior to the appearance of current on the drive winding D, core B will still be saturated in the counterclockwise direction when the drive signal is applied so that it cannot switch. The current in the short circuit winding SC, which is required in order to switch core C, loads core A to such an extent as will prevent core A from switching. Therefore, core A will not switch, and there will be no output signal generated in the output winding O.

As before described, the cores may be thought of as having two stable states, these are frequently identified with the binary bits ONE and ZERO, respectively. A well-known "dot-notation," frequently used in explaining circuit operation in terms of binary numbers, specifies that current flowing into the dotted end of a winding on a core will switch the core to the ZERO state, and induce a voltage across every other winding, the dotted ends of which will be positive, causing current to tend to flow out of the dotted ends. Similarly, current flowing into the undotted end of a winding on a core will switch that core to the ONE state, and induce a voltage across each of the other windings, the dotted end of such windings being negative, causing current to tend to flow into the dotted ends. Due to the popular use of this notation, the circuit of FIG. 1*c* will be redescribed in terms of dotted windings.

Applying the dot notation to the circuit of FIG. 1*c*, current on the reset winding R flows into the undotted end of the winding on core B tending to switch core B to a ONE, into the dotted end of core C switching that core to ZERO, and into the undotted end of core A switching that core to a ONE. However, as before described, core B is never switched by the reset windings, it always being left set with counterclockwise flux, which is equivalent to a ONE, so that core B does not tend to generate current in the short circuit winding SC. Since core C has switched to ZERO and core A has switched to ONE, current tends to flow out of the dotted end of the core C short-circuit winding and out of the dotted end of the core A short-circuit winding and these currents thereby cancel.

When an input signal is applied to the input winding I, current flows into the dotted end of the input winding on core B, switching core B to ZERO, and current flows into the undotted end of the winding on core C, switching core C to a ONE. Current, therefore, tends to flow out of the undotted end of the short-circuit winding on core C, and out of the dotted end of the short-circuit winding on core B. Therefore, these currents cancel and there is no net current induced in the short-circuit winding.

Following an input signal, a drive signal on drive winding D applies current to the dotted end of the drive winding on core A, which tends to switch core A to zero, and induces a voltage across the short-circuit winding of core A which tends to send current out of the dotted end of that winding. This current would, therefore, flow into the undotted end of the short-circuit winding linking core B, which tends to switch core B to ONE. The limited drive current applied to the undotted end of the drive winding on core B also tends to switch core B to a ONE. Therefore, current in the short-circuit winding and current in the drive winding can combine to switch core B to the ONE state, thereby supplying an E.M.F. across the short-circuit winding which will support the switching of core A.

In a sequence of operation in which no input signal is applied, drive current on the drive winding D tends to switch core A to zero as before, but the E.M.F. generated in the short-circuit winding which tends to put current into the undotted end of the short-circuit winding on core B can have no effect on core B, since core B will still be set in the ONE state. Since drive current applied to core A by the drive winding D is limited, as before described, the E.M.F. induced in the short circuit winding SC is not sufficient to switch core C, and since core C does not receive any drive current directly by the drive winding D, the total current is insufficient to switch core C. Therefore, core C cannot switch, core B cannot switch, and since there is no E.M.F. in the B and C windings of the short circuit-winding SC to support the switching of core A, core A cannot switch.

SECOND EMBODIMENT—WITH LOGICAL OUTPUT

[FIG. 1*d*]

Figures 4, 5:
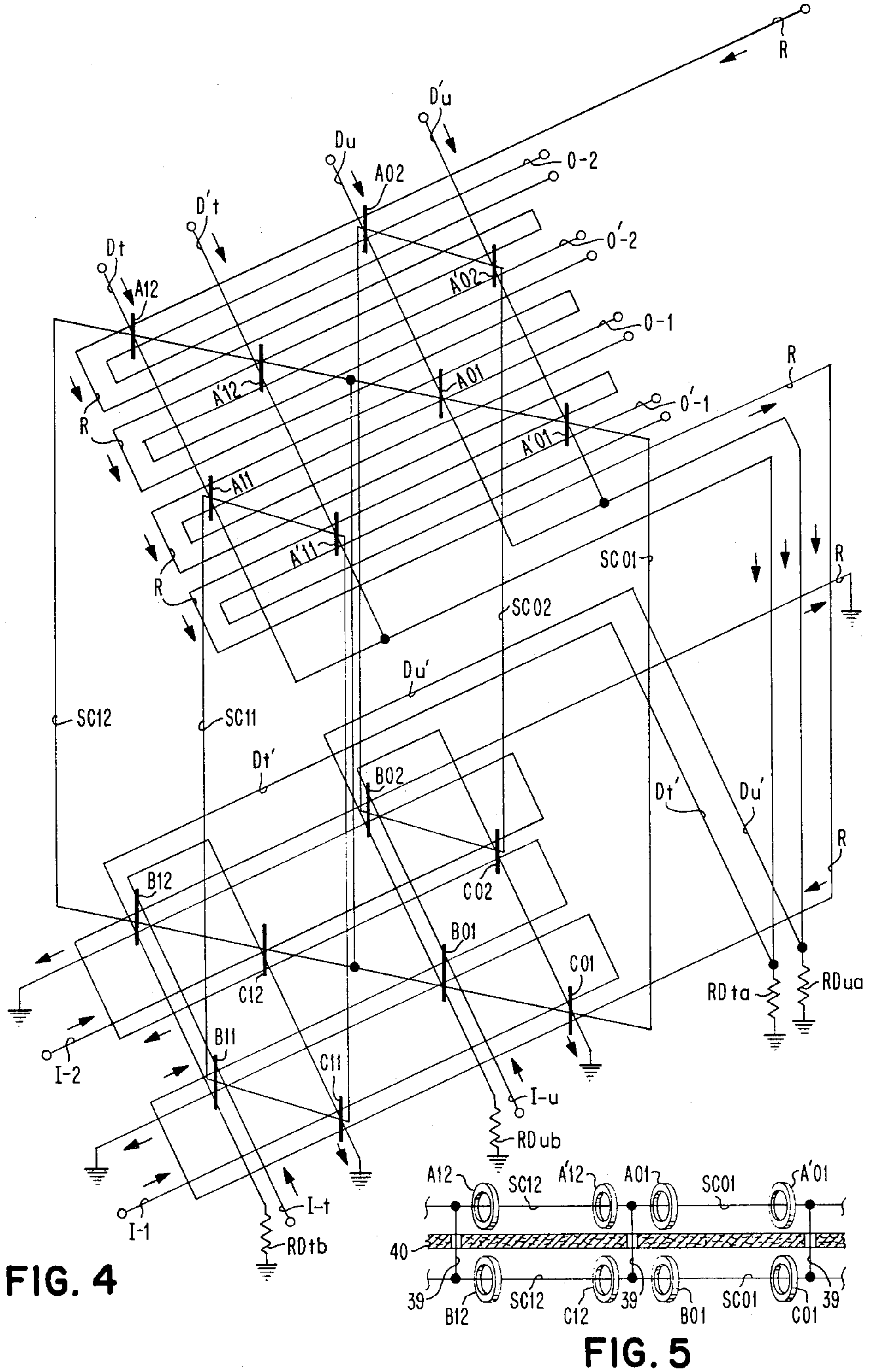
FIG. 4 is a schematic representation of a two-by-two matrix register employing the circuit shown in FIG. 1*d* and arranged in two planes with straight, single-turn windings.
FIG. 5 is a partial side elevation of a two-plane array of the type shown schematically in FIG. 4, showing simple short circuiting connections between planes.

A form of shift register capable of performing output logic is shown in FIG. 1*d*. This circuit is identical to that shown in FIG. 1*a*, except that two output cores A, A′ are provided, with corresponding drive windings D and D′. The drive windings D and D′ each have resistors RD*a*, RD*b* and RD′*a* and RD′*b* respectively for limiting drive currents in the same manner as in FIG. 1*a*. It will be remembered from the summary of operation, that current in the drive winding D tends to switch core A, and core A will switch only if core B can switch with it. This being so, current applied to either drive winding D, D′ will affect only its respective output core A, A′ and core B, it being immaterial to core B which of the drive windings D, D′ has current applied thereto. The current on either of the drive windings D or D′ may be the same as the current supplied to the drive winding D in the embodiment of FIGS. 1*a* and 1*c*. If current is applied to winding D, it will tend to switch core A; current applied to winding D′ will tend to switch core A′. If core B has been switched to the left by an input signal on line I, one of the cores A, A′ will switch, generating an output signal on a corresponding output winding O, O′. Since only one drive winding D or D′ is energized in any one sequence of operation, the drive windings D and D′ may be joined after threading through cores A and A′, respectively. This would provide a single drive winding through core B, and permit use of a single set of resistors, as in FIG. 1*a*. This modification is shown in FIG. 4, to be described hereinafter. Since the input winding I does not thread core A or core A′, this modification does not affect the input signal.

The circuit arrangement of FIG. 1*d* permits the shift register itself to provide logical output, it being unnecessary to use other well-known logic circuits in order to properly orient the output from the shift register. A simple use of this circuit as an AND circuit is apparent in that the combination of input current on line I plus drive current on line D would yield the function "I AND D"; similarly, no current on line I would yield the function "NOT-I AND D." Alternatively, the function "I AND D'" or "NOT-I AND D'" can be generated. An other use of this type of circuit will be described hereinafter, with reference to FIG. 4.

THIRD EMBODIMENT—OPPOSING SWITCH CORE

[FIG. 2]

Figure 2:
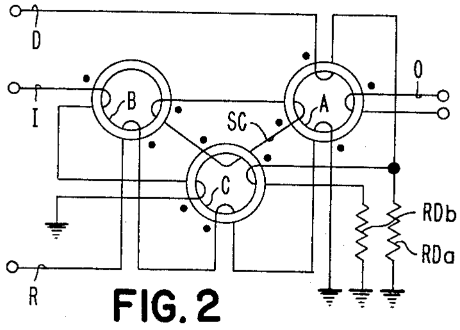
FIG. 2 is a schematic diagram of a third embodiment of my invention, wherein the device of FIG. 1*c* has a modified drive winding circuit.

Another embodiment of this invention, which is shown as a basic three-core type of shift register (not having dual output cores for logic functions), is shown in FIG. 2. By comparing the circuit of FIG. 2 with that shown in FIG. 1*c*, it can be seen that the only difference between this embodiment and the first-described embodiment is that drive current is supplied to core C instead of to core B. It will be remembered that the drive current supplied to the circuit shown in FIG. 1*c* tends to aid core B in switching. Core B is thereby switched partly as a result of current flowing through RD*b*, and partly as a result of current flowing through the short-circuit winding SC induced by the switching of core A. Contrarywise, no drive current is supplied to core B in the embodiment of FIG. 2, but drive current is applied to core C in opposition to the E.M.F. which tends to be generated in the short-circuit winding SC as a result of drive current flowing through core A.

The operation of the circuit of FIG. 2 will now be described. Reset and input currents will establish the direction of flux saturation in the cores in the same manner as in the embodiment of FIGS. 1*a*–1*c*. Drive current applied to winding D tends to switch core A to the clockwise direction, which in turn tends to generate a clockwise current in the short-circuit winding SC. This in turn tends to switch core C into the counterclockwise direction. However, the current flow through resistor RD*b* opposes the current flowing in the short-circuit winding SC, so that core C cannot switch. Since the short-circuit current through core C is opposed by the current through RD*b*, core C has no effect on the current flow through the short-circuit winding SC. Therefore, a maximum E.M.F. can be generated at core B, and, if the current applied to the drive winding D is of the proper magnitude, (higher than that used in the embodiments of FIGS. 1*a*–1*d*) the current in the short-circuit winding SC induced by the tendency of core A to switch, will cause core B to switch, thus producing a back E.M.F. sufficient to support the switching of core A. Stated alternatively, when core A tries to switch, it finds a "load" in core B, the E.M.F. of which is reflected to core A by the short-circuit winding SC; therefore, the current in the drive winding D will switch both of these cores simultaneously.

If no input signal is applied, then core B is saturated in the counterclockwise direction, so that counterclockwise current in the short-circuit winding, induced by core A, will have no effect on core B. Since core C has current applied to it by the drive winding D which tends to switch core C into the clockwise direction, this will prevent core C from switching in the counterclockwise direction, resulting in no back E.M.F. to support the switching of core A, and core A will therefore not be able to switch.

It will be noticed that the operation of the circuits (that is, the switching—or lack of switching—of cores) is the same in the embodiment of FIG. 2 as it is in the embodiments of FIGS. 1*a*–1*c*. The difference is that, in FIG. 2 core A is driven in a manner which tends to switch core B through current induced in the short-circuit winding SC, and core C is prevented from switching, in a no-input sequence of operation, by current supplied to core C via the drive winding D. The current in core C is limited by the resistors RD*a* and RD*b* so that when there is an input sequence of operation, the current supplied by the drive winding D will not be sufficient to cause core C to switch (instead of core A) but will be barely sufficient to oppose the effect of the oppositely-directed current induced in the short-circuit winding by core A.

COMBINED EMBODIMENT

[FIG. 3]

Figure 3:
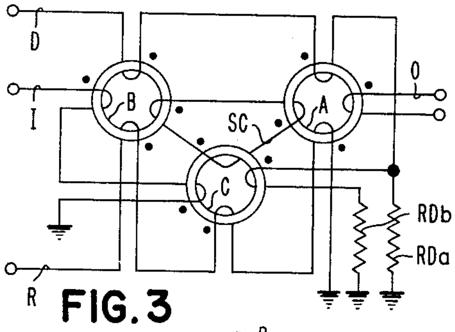
FIG. 3 is a schematic diagram of a fourth embodiment of my invention, combining the features of the embodiments of FIGS. 1*c* and 2.

Another embodiment of the invention, which incorporates the modes of operation of the prior two embodiments is shown in FIG. 3. By comparison with FIG. 1*c* and FIG. 2, it can be seen that the cores, the input winding I, the reset winding R, and the short-circuit winding SC are each identical to those in FIG. 3. The difference in this embodiment is that relatively unlimited drive current is applied to core B (that is, the same as is applied to core A) and limited drive current is applied to core C, in addition to the drive current applied to core A. In this embodiment, core B is positively driven by current on the drive winding D so that during a sequence of operation in which there is an input signal, core B can switch. Core C is prevented from switching during a no-input sequence by the current flowing through resistor RD*b*.

The embodiments shown in FIGS. 2 and 3 could incorporate one or more additional output cores A, A' as in the embodiment of FIG. 1*c*. The choice of the number of output cores is immaterial to the operation of any of the embodiments shown, since the output core A, A' (or any additional output cores) driven by a respective drive winding D, D' (or respective additional drive windings) is completely independent of the reset of the circuit, *except* that core B must be able to switch at the same time as the selected one of the output cores.

PLANAR MATRIX

[FIGS. 4 and 5]

In accordance with the present invention, sets of toroidal cores can be arranged in matrices of any size commensurate with the present toroidal core matrix art. Specifically, the matrices need not be limited to only a few shift registers in each coordinate, but may have hundreds of shift registers in each of said coordinates. One exemplary embodiment of my invention, shown in FIG. 4, is a two-by-two matrix comprising two planes of toroids arranged so that all windings may be single turn, straight wires, the length of which are coextensive with the dimensions of the plane.

As will be described more fully hereinafter, it can be seen that the upper and lower plane are not connected by lines within the plane except for the short-circuit windings SC. The reset and drive windings (R, D*u*, D'*u*, D*u*', D*t*, D'*t* and D*t*') shown at the right of FIG. 4 are not within the plane, but are connected externally thereof; also, the number of external wires required is limited only by the number of inputs and outputs desired, since, for instance, the reset winding R is available to reset *all* of the cores in the plane, without regard to the number of cores used. The circuit of FIG. 4 is a two-by-two matrix, comprising four shift registers, each of said shift registers being identical to that of the embodiment shown in FIG. 1*d*. Each of the shift registers has four cores, two output cores A, A', a storage core B, and a switch core C. The cores in FIG. 4 are numbered according to their position within the matrix, the four cores comprising a shift register having similar numbers: for instance, A02, A'02, B02 and C02 comprise a shift register.

Referring to the lower left of FIG. 4, an input winding I–2 threads to the right through cores C12 and C02, and threads to the left through cores B02 and B12. This winding represents a cardinal input, that is an input for "digits," and designates the numeral "two." A second cardinal input winding I–1 represents the numeral "one." This threads to the right through cores C11 and C01, and threads to the left through cores B01 and B11. At the bottom of FIG. 4 are the ordinal input windings. Winding I–*u* represents "units," or ten to the zero power and threads to the left through cores B01 and B02 and to the right through cores C02 and C01. Another ordinal input winding I–*t* represents "tens," or ten to the first power, and threads to the left through cores B11 and B12 and to the right through cores C12 and C11. Although each of these input windings is shown going to ground, it should be understood that they may thread additional cores, or be applied directly to a non-ground return line at a source of signals.

Referring to the top of FIG. 4, four drive windings are shown. Winding D*u* threads to the right through cores A02 and A01. Winding D'*u* threads to the right through A'02 and A'01. The two drive windings D*u* and D'*u* join and pass downward to a common resistor RD*ua*, which divides the current (in conjunction with RD*ub*) as do the resistors RD*a* and RD*ua* in FIG.1*d*. In this embodiment, a single resistor RD1*a* is chosen since it is desirable to have a single winding D*u*' pass to the left from RD*ua* and to the right through two cores B02 and B01, to the other current dividing resistor RD*ub*. As described with reference to FIG. 1*d*, only one drive winding (D or D') is energized at any one time, so that the separate identities need not be maintained except within the output (A) cores. Similarly, the drive winding D*t* passes to the right through A12 and A11, and then joins the drive winding D'*t* which passes to the right through cores A'12 and A'11. These windings then combine and connect with the current dividing resistor RD*ta*. A common drive winding D*t*' passes to the left from RD*ta* and then to the right through cores B12 and B11 to the other current dividing resistor RD*tb*.

At the upper right of FIG. 4 are shown the output windings, which respectively correspond to the "one" and "two" inputs referred to hereinbefore. Specifically, the output winding O–2 and the output winding O'–2 comprise outputs from cores in the rows corresponding to "two"; the output windings O–1 and A'–1 provide output signals from cores in the "one" rows. Whether the output will appear on a primed or unprimed output depends only upon whether a primed or unprimed drive winding is energized to derive an output signal, as described with reference to FIG. 1d, hereinbefore.

At the extreme upper right corner in FIG. 4, the reset winding R is shown. This winding travels to the left through each of the cores in the output plane (A02–A'11) and then travels downward and into the input plane. The reset winding R threads to the left through the "C" cores, and threads to the right through the "B" cores, and is then terminated at ground (or in any other suitable way).

A short-circuit winding is provided for each of the shift registers in FIG. 4. For instance, the "02" shift register comprising cores A02, A'02, B02 and C02 are interconnected by the short-circuit winding SC02. Similarly, the "12" shift register is interconnected by the short-circuit winding SC12, the "11" shift register is interconnected by the short-circuit winding SC11 and the "01" shift register is interconnected by the short-circuit winding SC01. Note that SC12 shares a common leg with SC01.

An example of the operation of the apparatus in FIG. 4 will now be given. Assume that the number "twelve" is to be stored and later retrieved from the apparatus of FIG. 4. The sequence of operation includes energizing the "units" input winding I–*u* and the digit "two" input winding I–2 simultaneously. This will pass current from right to left through core B02 on two windings, and from left to right through core C02 on two windings, simultaneously. Since each of the input windings I–*u* and I–2 carry one-half of the current necessary to switch the cores, the simultaneous currents will be sufficient to switch cores B02 and C02, as before described. Next, the "tens" input windings I–*t* and the digit "one" input winding I–1 will be simultaneously energized to switch cores B11 and C11. At some subsequent time, the status of the register will be sampled (or, alternatively stated, the data therein will be read out)by applying signals to drive windings.

It should be noted here, that any set of drive windings (D*u*, D*t* or D'*u*, D'*t*) can be energized simultaneously, or they may be energized sequentially; it is immaterial to the operation of this device, and is significant only as the outputs may affect the utilization device which is to receive the output signals. For simplicity, sequential operation will be described.

Assuming first that unprimed outputs are desired, a drive signal is applied to drive winding D*u*, which sends current to the right through core A02 and core A01. Since the "B" and "C" cores for the "01" shift register were not switched during the application of input signals, core A01 cannot switch at this time. However, since cores D02 and C02 were previously switched, by current simultaneously applied on input windings I–*u* and I–2, core A02 *can* switch, and it will provide an output pulse on the "two" output winding O–2. Next, a drive signal is applied to the drive winding D*t*, which sends current to the right through cores A12 and A11. Core A12 cannot switch, but core A11 can switch (as a result of having simultaneous input signals previously applied on input (lines I–*t* and I–1) and provides an output signal on the "ones" output line O–1. Of course, the primed drive windings D'*u*, D'*t* could have been energized instead of the unprimed windings, and the output signals would have appeared in the same manner on the respective primed output windings O'–2 and O'–1.

As another example, consider placing only the number "one" into the apparatus. No current will be applied to the "tens" input winding I–*t*, so that none of the "tens" shift register input cores C11, B11, C12, or B12 will be switched. Current will be simultaneously applied to the "units" input winding I–*u* and to the digit "one" input winding I–1. These will combine to send switching current to the left through core B01 and to the right through C01. Later, assuming that primed outputs are desired, the drive winding D'*u* will have a signal applied thereto, sending current downward through core A'02 and core A'01. Since the input cores C01 and B01 were switched, the output core A'01 will switch and the output core A'02 will not switch. Therefore, an output signal is generated on the primed "one" output winding O'–1. Next, the primed "tens" drive winding D'*t* has a drive signal applied to it. This will send current downward through the cores A'12 and A'11, but since the "11" shift register and the "12" shift register have received no input signals neither of these cores can switch, and there will be no output as a result thereof. This permits the read-out of the different orders of a number sequentially, units first, highest order last, to facilitate many well-known data handling techniques.

In the above two examples, it should be remembered that the current necessary to assist the "B" cores (B01, B02 and B11, B12) is applied through the combined drive windings D*u*' and D*t*' respectively, although it was not so described.

From the above operation, it can be seen that the input signals are applied to the correct core by having half-select current on either the "units" or "tens" input windings simultaneously with half-select current on either the digit "one" or digit "two" input winding. The output windings are arranged differently, so that all like orders (for instance, all "tens") are driven simultaneously, and output signals appear on windings which correspond to their numeral value (for instance "twos" and "ones").

The windings in the matrix planes of FIG. 4 could be arranged in other ways. For instance, the positions of the cardinal input windings (I–1, I–2) and the ordinal input windings (I–*u*, I–*t*) could be interchanged. Then the drive windings would represent numerals, and the output windings would represent powers of ten. In such an arrangement, read-out is effected by applying current to the "two" drive winding and the "one" drive winding, and the resulting output signals appear on "tens" or "units" output windings, as the case may be.

The two-by-two matrix described was chosen for purposes of illustration only, it being contemplated that a much larger matrix would be used in actual practice.

The bi-planar matrix shown in FIG. 4 could be made with only a single output core in each shift register. This would be done by merely eliminating: drive windings D′$u$ and D′$t$; cores A′01, A′02, A′11 and A′12; and output windings O′–2 and O′–1. Similarly, either of the embodiments of FIGS. 2 and 3 could be chosen as the basic unit, with or without multiple output cores.

The apparatus of FIG. 4 requires no internal connection between the planes except the short-circuit windings. The short-circuit windings can easily be made (as seen in FIG. 5) by placing short lengths of vertical connecting wires 39 downward through a supporting board member 40. Alternatively, the wires which actually thread the cores (shown as horizontal wires in FIG. 5) could be spot-welded together under pressure automatically by machines, so that a wire in the upper plane would be spot-welded to a corresponding wire in the lower plane, at each of the holes in the board 40. The actual method of connecting these is not critical to the present invention. This construction permits use of very large planar matrices, with little additional manufacturing difficulty.

While the invention has been particularly shown and described with reference to preferred embodiments thereof, it will be understood by those skilled in the art that the foregoing and other changes in form and details may be made therein without departing from the spirit and scope of the invention.

I claim:

1. A circuit of the type in which toroidal magnetic cores having substantially square hysteresis loop characteristics are selectively interconnected with windings, the windings being responsive to external signals to saturate the cores with flux oriented in either of two directions, comprising:

a first core;

a second core;

a third core;

a short-circuit winding linking each of said cores;

a winding linking each of said cores in a manner so that, when energized, it will set said first core and said second core in a first one of said directions and set said third core in the second one of said directions;

a winding linking said second core and said third core in opposite directions so that, when energized, it will switch said second core from said first into said second direction and said third core from said second into said first direction;

a drive winding linking said first core and said second core in opposite directions, so that, when energized, it will tend to switch said first core from said first into said second direction and said second core from said second into said first direction;

and means for limiting the current in said drive winding so as to be insufficient to switch said first core from said first into said second direction and, by current induced in said short-circuit winding, to simultaneously switch said third core from said second into said first direction.

2. A circuit of the type utilizing toroidal magnetic cores of high remanence, said circuit being controlled by external energization of the various windings on said cores, comprising:

first, second, and third toroidal cores of substantially the same size and having substantially the same characteristics;

a short-circuit winding interconnecting all of said cores;

a winding for setting the flux in said first and second cores in a first direction and the flux in said third core in a second direction;

a winding for switching the flux in said second core from said first into said second direction and the flux in said third core from said second into said first direction;

a drive winding for switching the flux of said first core from said first into said second direction and for switching the flux in said second core from said second into said first direction;

and current limiting means connected to said drive winding so as to limit the current applied by said drive winding to said first core to a value which is insufficient to switch said first core and, by current induced in said short-circuit winding, to simultaneously switch said third core, but which value is sufficient to switch said first core and, by current induced in said short-circuit winding, and the current in said drive winding so as to switch said second core.

3. A circuit of the type utilizing toroidal magnetic cores of high remanence, said circuit being controlled by external energization of the various windings on said cores, comprising:

first, second, and third toroidal cores of substantially the same size and having substantially the same characteristics;

a short-circuit winding interconnecting all of said cores;

a winding for setting the flux in said first and second cores in a first direction and the flux of said third core in a second direction;

a winding for switching the flux in said second core from said first into said second direction and the flux in said third core from said second into said first direction;

and a winding for switching the flux in said first core from said first direction into said second direction and for tending to switch the flux in said third core from said first direction into said second direction.

4. A circuit of the type in which toroidal magnetic cores having substantially square hysteresis loop characteristics are selectively interconnected with windings, the windings being responsive to external signals to saturate the cores with flux oriented in either of two directions, comprising:

a first core;

a second core;

a third core;

a short-circuit winding linking each of said cores;

a winding linking each of said cores in a manner so that, when energized, it will set said first core and said second core in a first one of said directions and set said third core in the second one of said directions;

a winding linking said second core and said third core in opposite directions so that, when energized, it will switch said second core from said first direction into said second direction and said third core from said second direction into said first direction;

a drive winding linking said first core and said third core in like directions, so that, when energized, it will tend to switch said first core and said third core from said first direction into said second direction;

and means for limiting the current applied by said drive winding to said third core so as to be insufficient to switch said first core from said first into said second direction and, by current induced in said short-circuit winding, to simultaneously switch said second core from said second into said first direction.

5. A circuit of the type utilizing toroidal magnetic cores of high remanence, said circuit being controlled by external energization of the various windings on said cores, comprising:

first, second, and third toroidal cores of substantially the same size and having substantially the same characteristics;

a short-circuit winding interconnecting all of said cores;

a winding for setting the flux in said first and second cores in a first direction and the flux of said third core in a second direction;

a winding for switching the flux in said second core from said first into said second direction and the flux in said third core from said second into said first direction;

a drive winding for switching the flux in said first core from said first into said second direction and for tending to switch the flux in said third core from said first into said second direction;

and current limiting means connected to said drive winding so as to limit the current applied by said drive winding to said third core to a value which is insufficient to switch said third core, and, by current induced in said short-circuit winding, to simultaneously switch said second core, but which value is sufficient to oppose the current induced in said short-circuit winding as a result of the switching of said first core so as to prevent the switching of said third core by current in said short-circuit winding.

6. A circuit of the type utilizing toroidal magnetic cores of high remanence, said circuit being controlled by external energization of the various windings on said cores, comprising:

first, second, and third toroidal cores of substantially the same size and having substantially the same characteristics;

a short-circuit winding interconnecting all of said cores;

a winding for setting the flux in said first and second cores in a first direction and the flux in said third core in a second direction;

a winding for switching the flux in said second core from said first into said second direction and the flux in said third core from said second into said first direction;

and a winding linking each of said cores for switching the flux in said first core from said first into said second direction, for switching the flux in said second core from said second into said first direction, and for tending to switch the flux in said third core from said first into said second direction.

7. A circuit of the type in which toroidal magnetic cores having substantially square hysteresis loop characteristics are selectively interconnected with windings, the windings being responsive to external signals to saturate the cores with flux oriented in either of two directions, comprising:

a first core;

a second core;

a third core;

a short-circuit winding linking each of said cores;

a winding linking each of said cores in a manner so that, when energized, it will set said first core and said second core in a first one of said directions and set said third core in the second one of said directions;

a winding linking said second core and said third core in opposite directions so that, when energized, it will switch said second core from said first into said second direction and said third core from said second into said first direction;

a drive winding linking said first core, said second core, and said third core so that, when energized, it will tend to switch said first core and said third core from said first into said second direction and said second core from said second into said first direction;

and means for limiting the current applied by said drive winding to said third core so as to be insufficient to switch said third core from said first into said second direction.

8. A circuit of the type utilizing toroidal magnetic cores of high remanence, said circuit being controlled by external energization of the various windings on said cores, comprising:

first, second, and third toroidal cores of substantially the same size and having substantially the same characteristics;

a short-circuit winding interconnecting all of said cores;

a winding for setting the flux in said first and second cores in a first direction and the flux in said third core in a second direction;

a winding for switching the flux in said second core from said first into said second direction and the flux in said third core from said second into said first direction;

a drive winding to switch the flux of said first core from said first into said second direction and said second core from said second into said first direction, and to tend to switch the flux of said third core from said first into said second direction;

and current limiting means connected to said drive winding so as to limit the current applied by said drive winding to said third core to a value which is insufficient to switch said third core, but which is sufficient to oppose the current induced in said short-circuit winding as a result of the switching of said first core so as to prevent the switching of said third core by current in said drive winding.

References Cited in the file of this patent

UNITED STATES PATENTS

| | | |
|---|---|---|
| 2,786,147 | Kaufman | Mar. 19, 1957 |
| 2,886,801 | Briggs | May 12, 1959 |
| 2,904,779 | Russell | Sept. 15, 1959 |
| 2,910,674 | Wittenberg | Oct. 27, 1959 |
| 2,939,117 | Brown | May 31, 1960 |
| 2,953,774 | Slutz | Sept. 20, 1960 |
| 2,974,310 | Russell | Mar. 7, 1961 |
| 2,974,311 | Kauffmann | Mar. 7, 1961 |